United States Patent
Kawamata et al.

(10) Patent No.: US 7,577,299 B2
(45) Date of Patent: Aug. 18, 2009

(54) IMAGE PICKUP APPARATUS AND IMAGE PICKUP METHOD

(75) Inventors: Shinya Kawamata, Gotenba (JP); Yasuo Hagisato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 901 days.

(21) Appl. No.: 10/788,293

(22) Filed: Mar. 1, 2004

(65) Prior Publication Data

US 2004/0175053 A1 Sep. 9, 2004

(30) Foreign Application Priority Data

Mar. 5, 2003 (JP) ............................. 2003-058955
Oct. 30, 2003 (JP) ............................. 2003-370834

(51) Int. Cl.
*G06K 9/76* (2006.01)
*G06K 9/40* (2006.01)
*G06K 9/36* (2006.01)

(52) U.S. Cl. .................. 382/210; 382/260; 382/261; 382/263; 382/274; 382/280

(58) Field of Classification Search ........... 382/293, 382/210, 260, 261, 263, 274, 280
See application file for complete search history.

(56) References Cited

U.S. PATENT DOCUMENTS

| | | | | |
|---|---|---|---|---|
| 5,128,769 A * | 7/1992 | Arai et al. | ................... | 348/363 |
| 5,173,788 A * | 12/1992 | Ohta | ..................... | 382/264 |
| 5,901,806 A * | 5/1999 | Takahashi | ................... | 180/170 |
| 5,936,773 A * | 8/1999 | Togino | ....................... | 359/630 |
| 6,144,407 A * | 11/2000 | Mizutani et al. | .......... | 348/220.1 |
| 6,151,136 A * | 11/2000 | Takemoto | ................... | 358/1.9 |
| 6,175,592 B1 * | 1/2001 | Kim et al. | .............. | 375/240.16 |
| 6,476,731 B1 * | 11/2002 | Miki et al. | ................... | 340/937 |
| 6,772,125 B2 * | 8/2004 | Harradine et al. | ........... | 704/278 |
| 6,937,775 B2 * | 8/2005 | Gindele et al. | ............. | 382/254 |
| 6,973,210 B1 * | 12/2005 | Platt et al. | ................... | 382/162 |
| 2003/0030605 A1 * | 2/2003 | Chen et al. | .................... | 345/87 |

FOREIGN PATENT DOCUMENTS

| | | | |
|---|---|---|---|
| DE | 199 61 313 A1 | | 7/2001 |
| JP | 60-231193 | * | 11/1985 |
| JP | A-2-78000 | | 3/1990 |
| JP | A 5-56341 | | 3/1993 |
| JP | A-7-282247 | | 10/1995 |
| JP | A 2001-313850 | | 11/2001 |
| JP | A-2002-262130 | | 9/2002 |
| WO | WO 02/89060 | * | 4/2002 |

OTHER PUBLICATIONS

U.S. Appl. No. 10/638,369, filed Aug. 12, 2003, Hagisato et al.
Haberäcker, Peter. Digitale Bildverarbeitung; Grundlagen und Anwendung (Digital image processing; Basics and applications). Hanser: München Wien, 1987. $2^{nd}$ edition. Chapters 2 and 9.

* cited by examiner

*Primary Examiner*—John B Strege
(74) *Attorney, Agent, or Firm*—Oliff & Berridge, PLC

(57) ABSTRACT

A form of the image pickup apparatus of the invention is characterized by including an image pickup portion that receives a incident light from an image-pickup object and performs a photoelectric conversion of the light, and an image processing portion that performs a spatial filter process of removing a predetermined low-frequency component from a picked-up image output by the image pickup portion.

16 Claims, 18 Drawing Sheets

F I G . 1
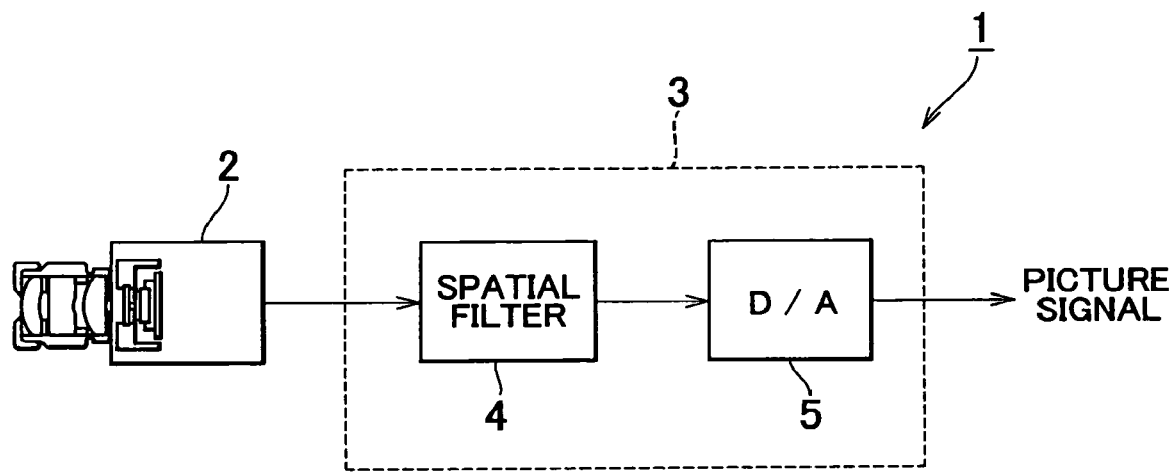

FIG.6

| -1 | -1 | -1 |
|----|----|----|
| -1 | 9  | -1 |
| -1 | -1 | -1 |

F I G . 7

| -1 | 3 | -1 |

LOW CUTOFF FREQUENCY

HIGH CUTOFF FREQUENCY

HIGH CUTOFF FREQUENCY

LOW CUTOFF FREQUENCY

LOW CUTOFF FREQUENCY (FOR RAINY WEATHER)

HIGH CUTOFF FREQUENCY (FOR CLEAR WEATHER)

HIGH CUTOFF FREQUENCY (FOR CLEAR WEATHER)

LOW CUTOFF FREQUENCY (FOR RAINY WEATHER)

F I G . 14
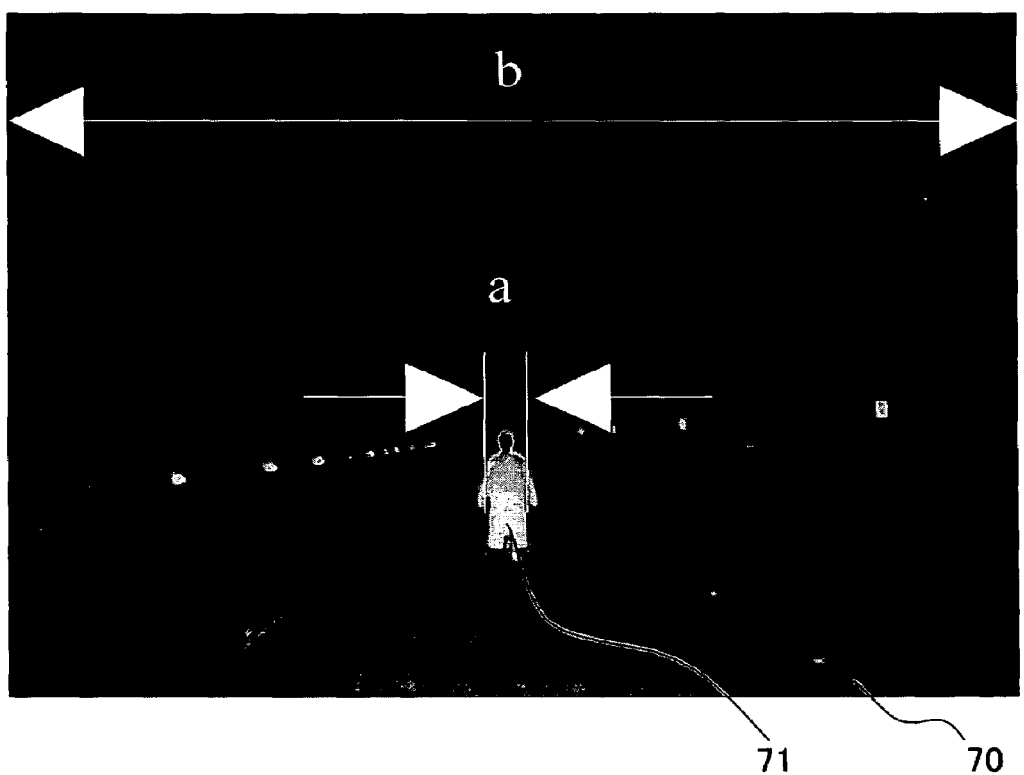

HUMAN AT DISTANCE OF 40m

BEFORE SPATIAL FILTER PROCESS

AFTER SPATIAL FILTER PROCESS

HUMAN AT DISTANCE OF 100m

BEFORE SPATIAL FILTER PRESSOC

AFTER SPATIAL FILTER PRESSOC

HUMAN AT DISTANCE OF 150m

BEFORE SPATIAL FILTER PRESSOC

AFTER SPATIAL FILTER PRESSOC

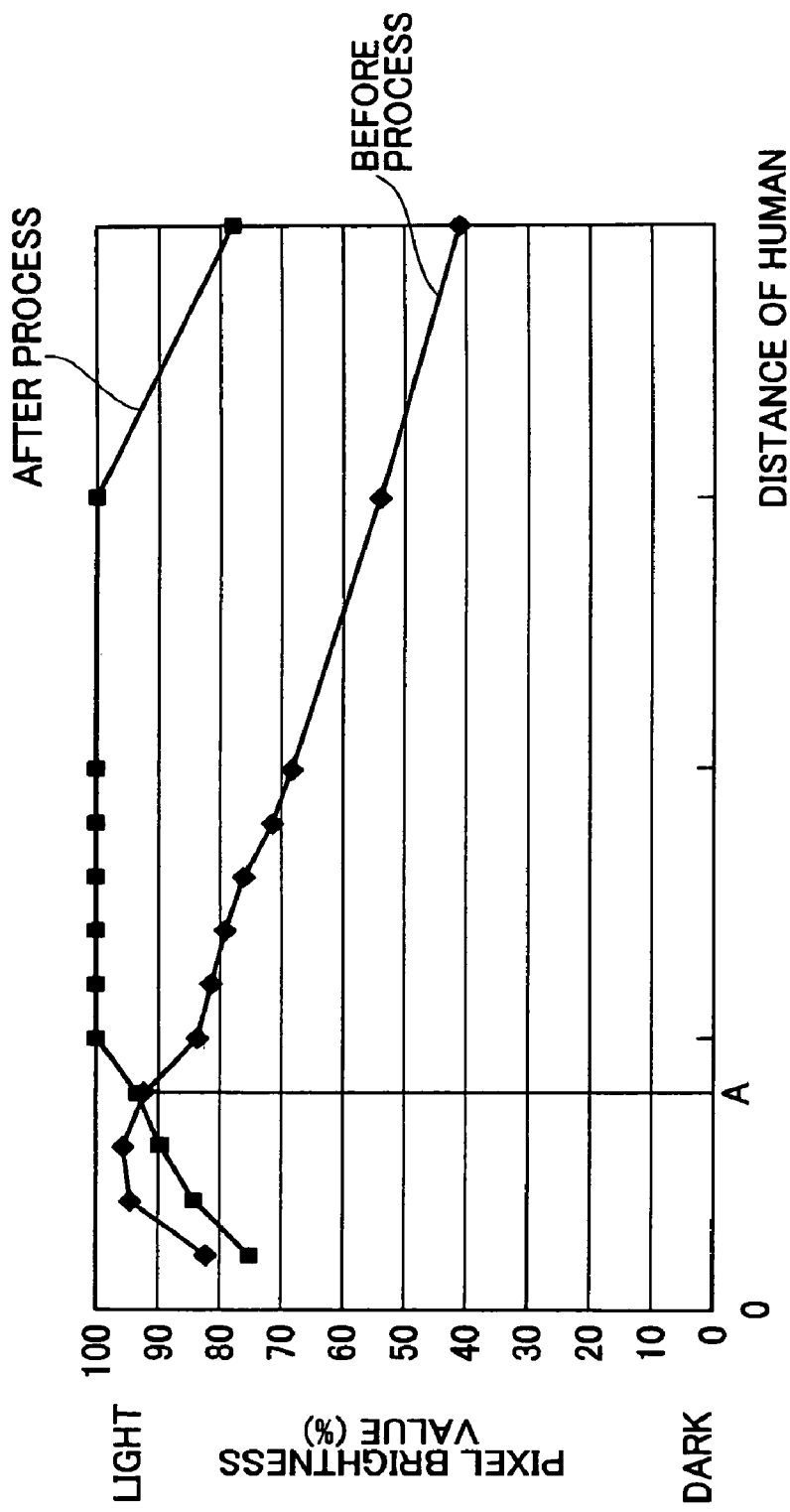

IMAGE PICKUP APPARATUS AND IMAGE PICKUP METHOD

INCORPORATION BY REFERENCE

The disclosure of Japanese Patent Application No. 2003-058955 filed on Mar. 5, 2003 and No. 2003-370834 filed on Oct. 30, 2003, including the specifications, drawings and abstracts, are incorporated herein by references in therein entirety.

BACKGROUND OF THE INVENTION

1. Field of the Invention

The invention relates to an image pickup apparatus suitable for nighttime picture taking and an image pickup method for the apparatus.

2. Description of the Related Art

A known image pickup apparatus is described in, for example, Japanese Patent Application Laid-Open Publication No. HEI 5-56341, in which incident light via an image pickup optical system is subjected to photoelectric conversion by a CCD, and is then output. This image pickup apparatus controls the amount of light transmitted to an image pickup optical system and the light accumulation time of image pickup elements, and variably controls the gain of output of the image pickup elements. During a predetermined picture taking mode, the apparatus performs such a control as to increase the gain, in order to reduce the set time of light accumulation. Thus, the apparatus attempts to optimize exposure control regardless of picture taking conditions.

However, this type of image pickup apparatus still suffers from problems of, for example, halation in picked-up images depending on picture taking environments. For example, if such an image pickup apparatus is used as a visual recognition support system that assists a driver of a vehicle in visual recognition during a nighttime run of the vehicle, the image pickup output is set high for visually recognition of a pedestrian or the like ahead in the running direction of the vehicle in a dark condition. However, with such a setting, the effect of halation becomes great, for example, when the image pickup apparatus is illuminated by the headlights of an oncoming vehicle. In such a case, therefore, the image pickup apparatus cannot appropriately take pictures.

SUMMARY OF THE INVENTION

The invention has been accomplished in order to solve the above-described problems, and an object of the invention is to provide an image pickup apparatus that is capable of appropriately outputting taken pictures in accordance with the picture taking environment.

A form of the image pickup apparatus of the invention is characterized by including an image pickup portion that receives a incident light from an image-pickup object and performs a photoelectric conversion of the light, and an image processing portion that performs a spatial filter process of removing a predetermined low-frequency component from a picked-up image output by the image pickup portion.

According to the above-described form of the invention, the removal of the predetermined low-frequency component from the picked-up image reduces the halation around a high-brightness portion in the picked-up image, and therefore allows appropriate picture taking.

In the above-described image pickup apparatus, the image processing portion may perform a discrete Fourier transform of the picked-up image, and may remove the low-frequency component from the discrete Fourier transformed-image, and then may perform an inverse discrete Fourier transform of the image. Therefore, the halation in the picked-up image can be effectively reduced.

Furthermore, in the foregoing image pickup apparatus, the image processing portion may perform the spatial filter process by using a one-dimensional digital filter or a two-dimensional digital filter. Therefore, the low-frequency component can be quickly removed.

Furthermore, in the foregoing image pickup apparatus, a pixel brightness value of the picked-up image of a range of at least a predetermined distance from the image pickup portion may become relatively greater than a pixel brightness value of the picked-up image of a range of less than the predetermined distance from the image pickup portion, due to the spatial filter process performed by the image processing portion.

Furthermore, with regard to the range of less than the predetermined distance in the picked-up image, the image processing portion may increase the pixel brightness value with increases in the distance from the image pickup portion. Still further, the image processing portion may perform the spatial filter process with a cutoff frequency set based on a ratio between a pixel region of the image-pickup object at the predetermined distance and a pixel region of the entire picked-up image.

Therefore, since the pixel brightness value of the image-pickup object apart from the image pickup portion by at least the predetermined distance is made relatively great, the distant object in the picked-up image is displayed in an enhanced fashion. Hence, the visibility of the distant object will improve.

In the foregoing image pickup apparatus, the image processing portion may perform the spatial filter process via a spatial filter of a predetermined cutoff frequency that is set in accordance with an ambient environment. Therefore, since the cutoff frequency is set in accordance with the ambient environment to remove the low-frequency component from the picked-up image, the halation around a high-brightness portion in the picked-up image can be reduced, and the picked-up image can be appropriately displayed in accordance with the ambient environment. Thus, the visibility of the image-pickup object will improve.

Furthermore, in the image pickup apparatus, the image processing portion may set the cutoff frequency based on a brightness of the ambient environment. The image processing portion may also set the cutoff frequency higher the brighter the ambient environment. Still further, the image pickup apparatus may further include an illuminance sensor that detects the brightness of the ambient environment, wherein the image processing portion sets the cutoff frequency based on the brightness of the ambient environment detected by the illuminance sensor.

Therefore, since the cutoff frequency is set on the basis of the brightness of the ambient environment, the influence of the ambient brightness can be curbed so as to appropriately display the picked-up image.

Furthermore, in the image pickup apparatus, the image processing portion may set the cutoff frequency based on a weather condition. The image processing portion may also set the cutoff frequency for a rainy weather lower than the cutoff frequency for clear weather. Still further, the image pickup apparatus may further include a raindrop sensor that detects the weather condition, wherein the image processing portion sets the cutoff frequency based on the weather condition detected by the raindrop sensor.

Therefore, since the cutoff frequency is set on the basis of the weather condition, the influence of the weather condition at the time of picture taking can be curbed so as to appropriately display the picked-up image.

Furthermore, in the image pickup apparatus, the image pickup portion may be disposed in a vehicle and may take an image of the image-pickup object present in a traveling direction of the vehicle. Furthermore, the image pickup apparatus may be used in a visual recognition support system that assists a driver of a vehicle in visual recognition during a nighttime run of the vehicle.

A form of the image pickup method of the invention for an image pickup apparatus having an image pickup portion that receives a incident light from an image-pickup object and performs a photoelectric conversion of the light, and an image processing portion that performs an image processing of a picked-up image, the method being characterized in that the image pickup portion outputs the picked-up image, and that the image processing portion performs an image filter process of removing a predetermined low-frequency component from the picked-up image output by the image pickup portion.

BRIEF DESCRIPTION OF THE DRAWINGS

FIG. 1 is a schematic illustration of the construction of an image pickup apparatus in accordance with a first embodiment of the invention.

FIG. 6 is a diagram illustrating an image pickup apparatus in accordance with a second embodiment.

FIG. 7 is a diagram illustrating an image pickup apparatus in accordance with a third embodiment.

FIG. 14 is a diagram illustrating the setting of a cutoff frequency of an image pickup apparatus in accordance with a sixth embodiment.

FIG. 18 is a diagram indicating relationships between the distance of a human and the pixel brightness value in images taken by the image pickup apparatus in accordance with the sixth embodiment.

DETAILED DESCRIPTION OF PREFERRED EMBODIMENTS

Figure 2:
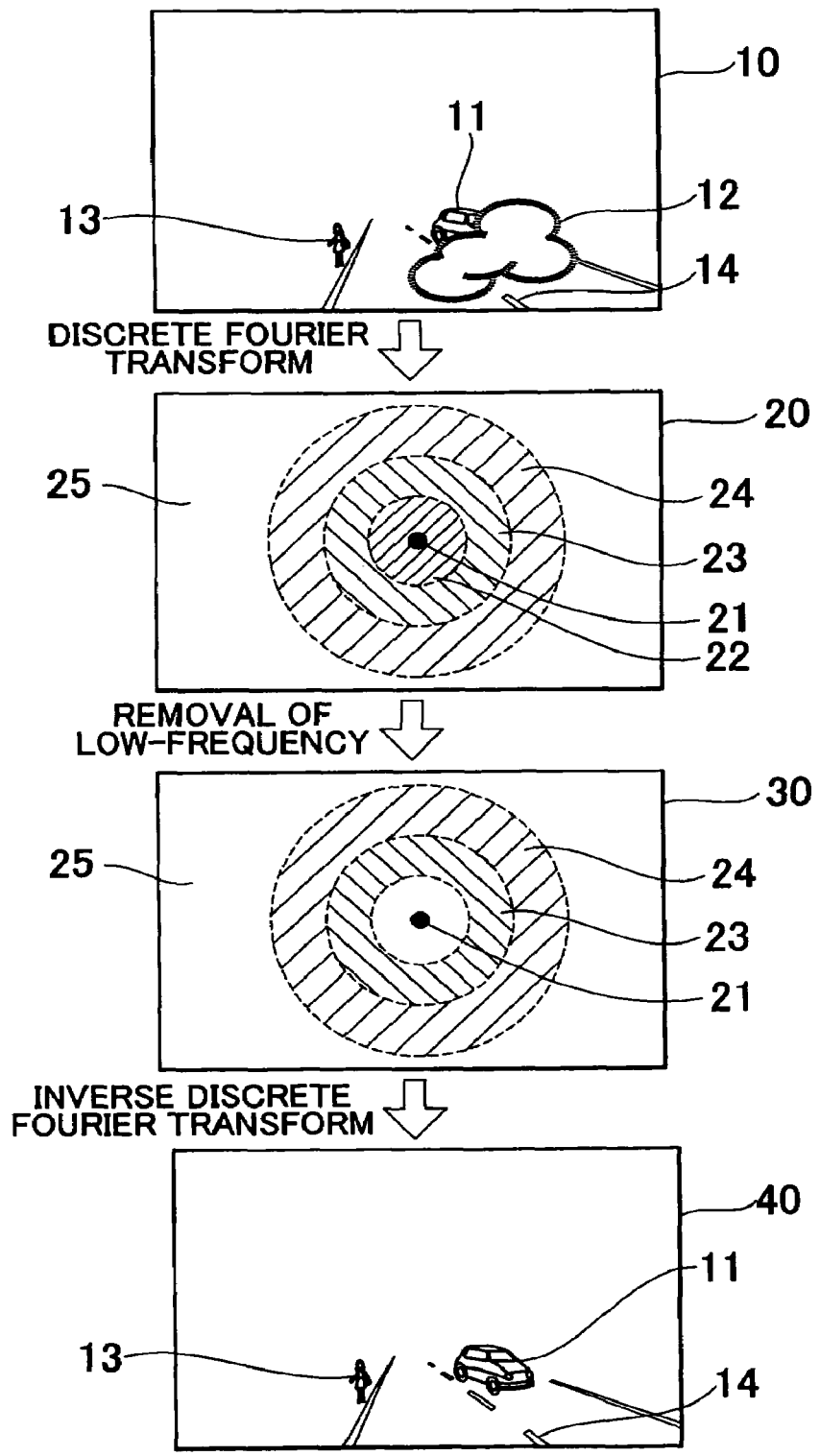
FIG. 2 is a diagram illustrating an image processing performed by the image pickup apparatus shown in FIG. 1.

Preferred embodiments of the invention will be described hereinafter with reference to the accompanying drawings. The same component elements are denoted by the same reference numerals, and will not be redundantly described below.

First Embodiment

FIG. 1 is a schematic illustration of the construction of an image pickup apparatus in accordance with a first embodiment of the invention. Referring to FIG. 1, an image pickup apparatus 1 includes an image pickup portion 2 and an image processing portion 3. The image pickup portion 2 receives incident light from an image-pickup object and performs photoelectric conversion of the received light, and is formed by, for example, a CCD (charge-coupled device) camera. The image pickup portion 2 has, therein, a CCD as an image pickup element. A picture-taking optical system is disposed forward of the CCD.

The image processing portion 3 performs the image processing of an acquired image output from the image pickup portion 2, and is formed by, for example, a spatial filter portion 4 and a D/A converter portion 5. The spatial filter portion 4 removes a predetermined low-frequency component from the spatial frequencies of acquired image signals to reduce the halation around high-brightness portions in an acquired picture. The D/A converter portion 5 performs digital-to-analog conversion of the output signals of the spatial filter portion 4, and output the converted signals as picture signals.

FIG. 2 illustrates a spatial filter process performed by the spatial filter portion. The spatial filter portion 4 used in this embodiment is, for example, a spatial filter that performs a discrete Fourier transform process, a low-frequency removal process, and an inverse discrete Fourier transform process. As shown in FIG. 2, the discrete Fourier transform process is a process of performing discrete Fourier transform of on original image 10 into a spatial frequency image 20. The original image 10 herein refers to an image based on acquired image signals output from the image pickup portion 2. In the original image 10 shown in FIG. 2, a halation portion 12 is formed around headlights 11 of a vehicle.

As for the spatial frequency image 20, a central portion thereof is a zero component 21 in which the spatial frequency is zero. Arranged around the zero component 21 are a low-frequency component 22, an intermediate-frequency component 23, a fairly high-frequency component 24 and a high-frequency component 25 in that order from inner to outer portions.

The low-frequency removal process is a process of removing a low-frequency component 22 from the spatial frequency image 20. The low-frequency removal process produces an image 30 formed by removing the low-frequency component from the spatial frequency image 20. The range of the low-frequency component is set so that the halation of a high-brightness portion related to an image-pickup object can be sufficiently reduced.

The inverse discrete Fourier transform process is a process of performing inverse discrete Fourier transform of the image 30 from which the low-frequency component has been removed so as to form an image 40 from which a low-spatial frequency component has been removed.

In the thus-acquired image 40, the halation portion 12 in which the brightness gradually changes due to the removal of the low-spatial frequency component. If the brightness level in the entire image 40 has reduced due to the removal of the low-frequency component, it is preferable to increase the brightness level of the entire image.

Figure 3:
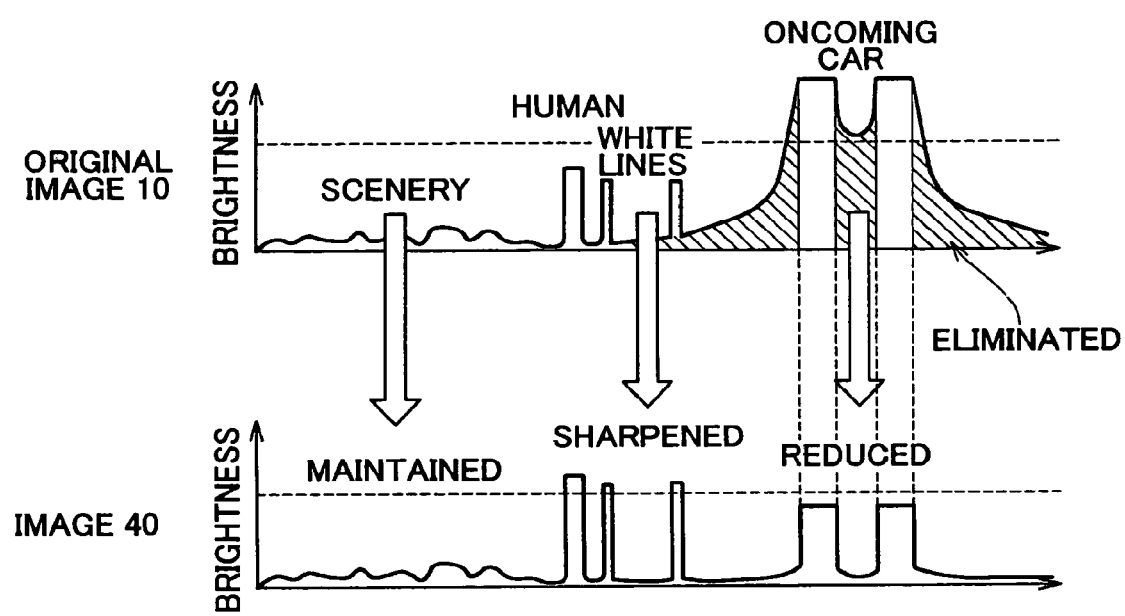
FIG. 3 is a diagram illustrating an image processing performed by the image pickup apparatus shown in FIG. 1.

FIG. 3 is a diagram illustrating image signals regarding the original image 10 and the image 40 obtained by the low-frequency removal process. As indicated in FIG. 3, the removal of the low-frequency component from the original image 10 considerably reduces the brightness levels of the headlight portion 11 of an oncoming vehicle and the halation portion 12 (see FIG. 2), and also reduces the brightness levels of a scenery portion in the background. Then, after the brightness level of the entire image is raised for the recovery from the reduced brightness level caused by the removal of the low-frequency component, the brightness level of the headlights of the oncoming vehicle is still lower than that in the original image 10, and the brightness level of the background scenery is substantially the same as that in the original image 10. Conversely, the brightness levels of a human 13 and white lines 14, that is, high-frequency components, on the road (see FIG. 2) become higher than those in the original image 10, so that the human 13 and the white lines 14 appear sharper and clearer.

Figure 4:
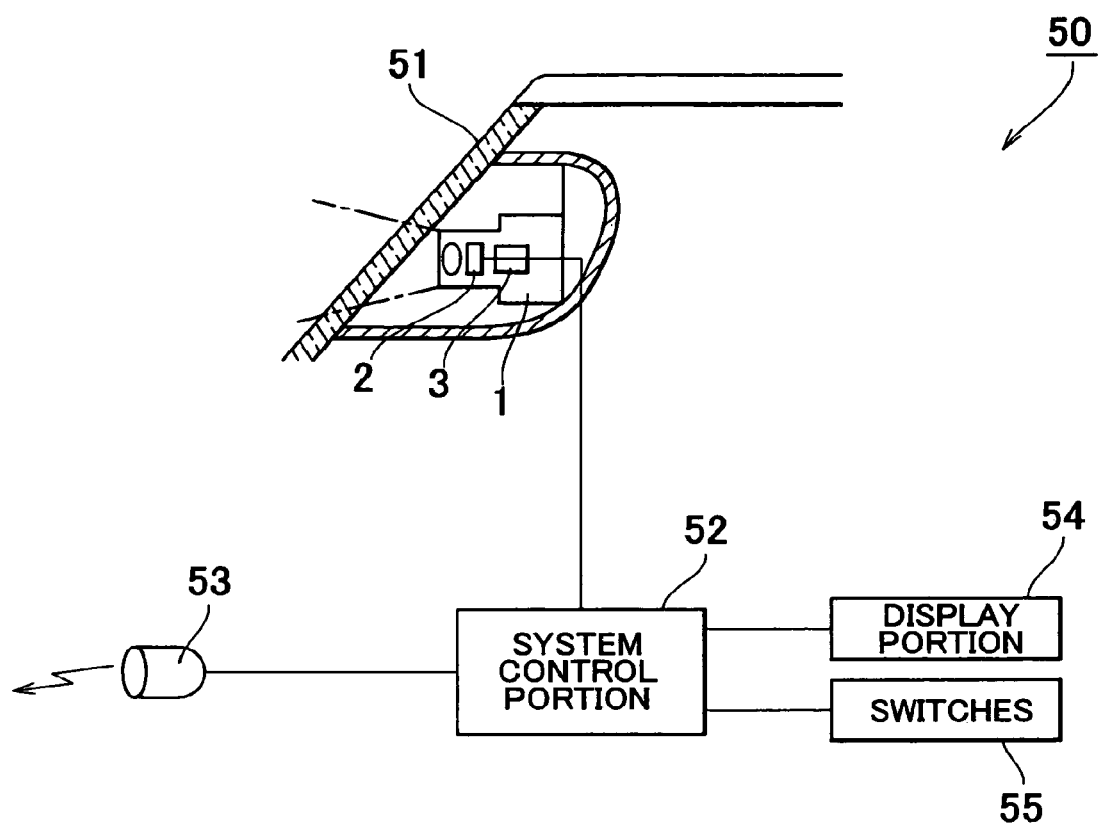
FIG. 4 is an illustration of an image pickup system incorporating the image pickup apparatus shown in FIG. 5.

FIG. 4 is an illustration of an image pickup system incorporating an image pickup apparatus in accordance with the embodiment. As shown in the drawing, an image pickup system 50 is disposed within a passenger compartment so as to acquire images outside the vehicle via the glass 51, and is applicable to, for example, a visual recognition support system that assists a vehicle's driver in visual recognition during a nighttime drive.

In an image pickup system 50, the image pickup apparatus 1 is used as a means for taking pictures outside the vehicle. The image pickup apparatus 1 is disposed within the vehicle's passenger compartment to take images of the view outside the vehicle via the glass 51. The image pickup apparatus 1 employed in the system is, for example, an apparatus having sensitivity to near-infrared radiation. By disposing a visible light cutoff filter in the picture-taking optical system of the image pickup portion 2 of the image pickup apparatus 1, picture acquisition based mainly on a near-infrared component becomes possible. The near-infrared radiation herein means a light having wavelengths of 780 to 1500 nm.

The output side of the image pickup apparatus 1 is connected to a system control portion 52. The picture signals acquired by the image pickup apparatus 1 are input to the system control portion 52. The system control portion 52 is a portion that controls the entire system, and is formed by, for example, a CPU, a ROM, a RAM, an input signal circuit, an output signal circuit, a power circuit, etc.

The image pickup system 50 includes a near-infrared projector 53. The near-infrared projector 53 is a projector means for projecting near-infrared rays forward of the vehicle. The near-infrared projector 53 receives signals from the system control portion 52 for control of the projection. The near-infrared projector 53 is constructed so as to project near-infrared light into an irradiation area corresponding to, for example, the high-beam projection from headlights.

The image pickup system 50 has a display portion 54. The display portion 54 is a display means for displaying pictures taken by the image pickup apparatus 1, and is designed so that a driver can see the pictures taken by the image pickup apparatus 1. The image pickup system 50 further includes switches 55 for, for example, switching on and off the system.

The image pickup system 50 projects near-infrared light from the near-infrared projector 53 forward of the vehicle while the vehicle is running at night. The near-infrared light is thus projected forward of the vehicle, and the image pickup apparatus 1 having sensitivity to the near-infrared range takes pictures of near-infrared-irradiated views forward of the vehicle.

Then, picture signals are input from the image pickup apparatus 1 into the system control portion 52. The system control portion 52 outputs picture signals to the display portion 54, so that the display portion 54 displays images based on the picture signals. Since images are displayed in a near-infrared-irradiated state, the display portion 54 allows easier detection of pedestrians than the driver's actual vision forward of the vehicle. Thus, the image pickup system 50 is able to assist the driver in the forward visual recognition. Furthermore, since the projected light is near-infrared light, the influence of the projected light on the safety of oncoming vehicles is minimum.

Furthermore, since the image pickup apparatus 1 performs the spatial filter process of removing a predetermined low-frequency component from acquired picture signals, the image pickup apparatus 1 is able to output pictures with reduced halation around high-brightness portions. Therefore, the display portion 54 displays pictures with reduced halation of the headlights of oncoming vehicles, so that pedestrians and the like can easily be recognized visually.

Figure 5:
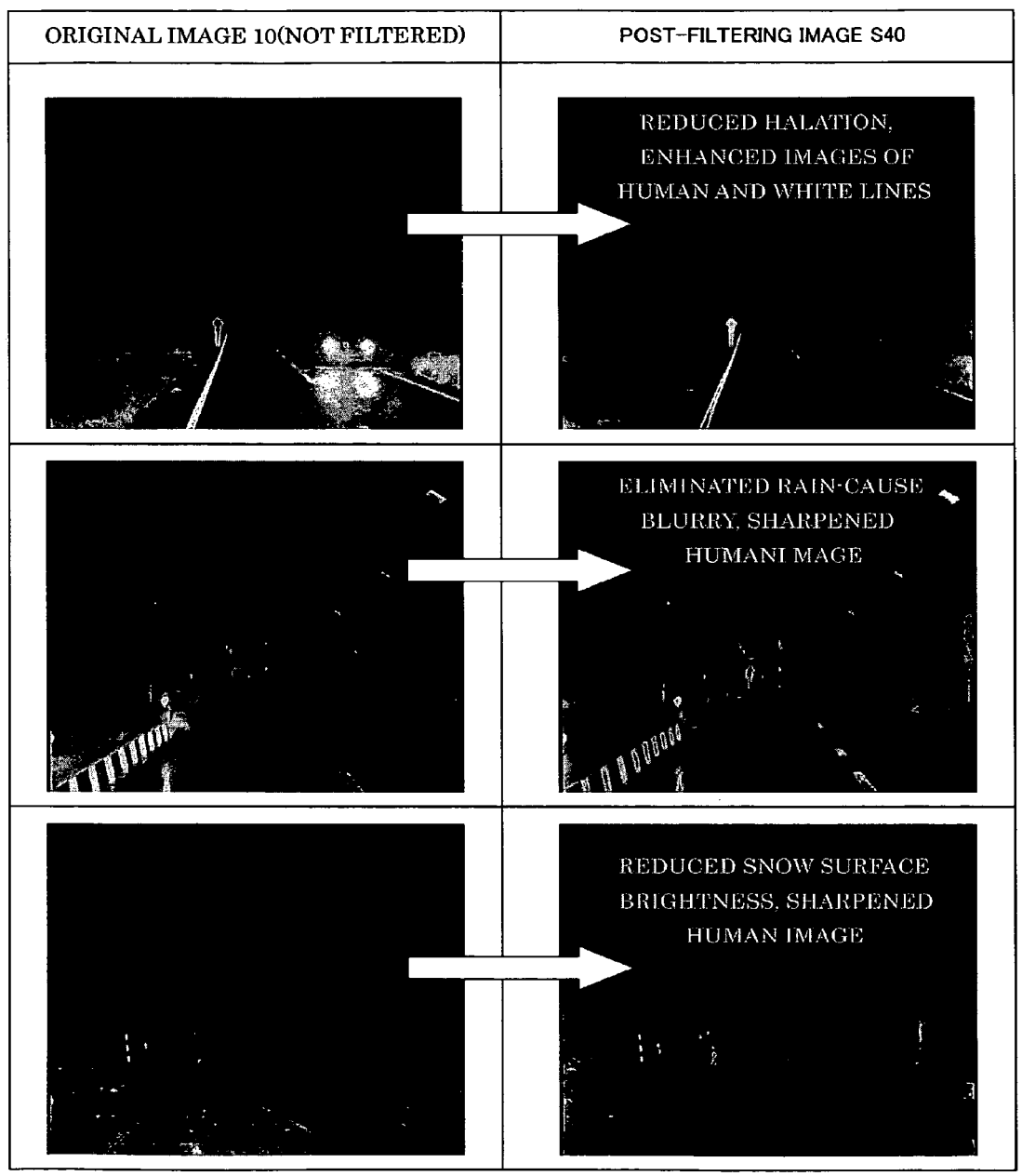
FIG. 5 illustrates images taken by the image pickup apparatus shown in FIG. 1.

FIG. 5 shows images acquired via the image pickup apparatus 1. The left-side images in FIG. 5 are original images 10 prior to the filter processing, that is, images from which the low-frequency component of the spatial frequencies has not been removed. The right-side images in FIG. 5 are images 40 after the filter processing, that is, images from which the low-frequency component has been removed.

The top row in FIG. 5 shows images with frontal irradiation from the headlights of an oncoming vehicle. A comparison of the left and right-side images in the top row in FIG. 5 shows that the halation caused by the headlights in the left-side image, that is, the original image 10, has been immensely reduced in the right-side image, that is, the image 40, so that the pedestrian at a road shoulder and the white lines on the road can be seen clearly in the image 40.

The intermediate row in FIG. 5 shows images taken in a rainy weather A comparison of the left and right-side images in the intermediate row in FIG. 5 shows that the reflection from the guardrail in the left-side image 10, has been reduced in the right-side image 40, so that in the image 40, a pedestrian with an umbrella near the center is easily visible.

The bottom row in FIG. 5 shows images taken in a snowy weather. A comparison of the left and right-side images in the bottom row in FIG. 5 shows that the reflection from the snow surface in the left-side image 10, has been immensely reduced in the left-side image 40, so that the pedestrian on the road in the image 40 is easily visible.

As described above, by removing a predetermined low-frequency component 1 from an image taken, the image pickup apparatus of this embodiment is able to reduce the halation around a high-brightness portion in the picked-up image, and is therefore able to acquire an appropriate image.

Furthermore, due to the discrete Fourier transform of an image followed by the removal of a low-frequency component from the image and then the inverse discrete Fourier transform, the halation in picked-up images can be effectively reduced.

Still further, the apparatus of the embodiment is useful as an image pickup apparatus disposed in a vehicle to take pictures outside the vehicle. Although the picture-taking environment greatly changes in this case, it becomes possible to perform appropriate picture taking corresponding to changes in the picture-taking environment. In particular, the use of the image pickup apparatus as a picture taking means in a visual recognition support system is optimum since the apparatus is able to appropriately display images taken even if the picture taking environment greatly changes.

Second Embodiment

An image pickup apparatus in accordance with a second embodiment will next be described. The image pickup apparatus of the second embodiment has substantially the same hardware construction as the image pickup apparatus 1 of the first embodiment shown in FIG. 1. However, the spatial filter portion 4 is not a filter that performs the discrete Fourier transform and the like, but is formed by a one-dimensional digital filter or a two-dimensional digital filter so as to remove a low-frequency component of the spatial frequencies of an image taken.

Figure 6:
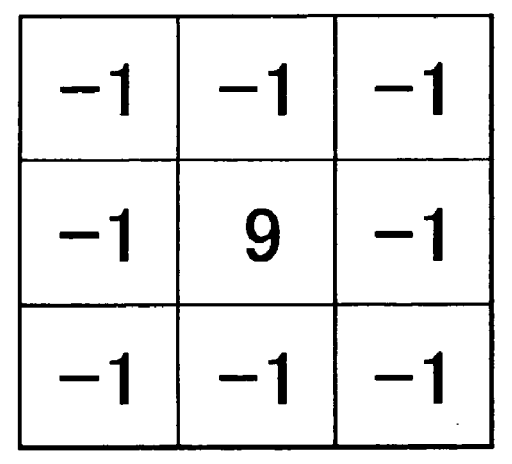
Figure 7:
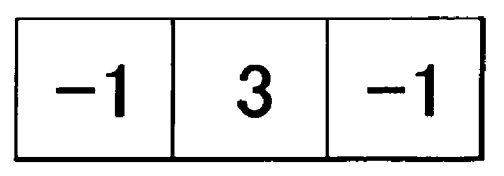

For example, a two-dimensional digital filter as shown in FIG. 6 is used to remove a low-frequency component from images taken. It is also possible to use a one-dimensional digital filter as shown in FIG. 7 for removing a low-frequency component from picked-up images. Although in each filter shown in FIGS. 6 and 7 the number of taps is 3, it is preferable that the number of taps of the filter be as great as possible.

This image pickup apparatus is able to reduce the halation in picked-up images as in the image pickup apparatus of the first embodiment. Furthermore, since the image processing can be simplified, the apparatus of the second embodiment is capable of quickly executing the image processing.

Third Embodiment

An image pickup apparatus in accordance with a third embodiment will next be described. The image pickup apparatus of the third embodiment has substantially the same hardware construction as the image pickup apparatus 1 of the first embodiment shown in FIG. 1. However, the spatial filter portion 4 has a plurality of spatial filters having different cutoff frequencies. The spatial filter portion 4 inputs a camera shutter speed signal from the image pickup portion 2, and executes a spatial filter process by using an optimal spatial filter selected on the basis of the camera shutter speed signal.

The image pickup portion 2 is designed so as to output the camera shutter speed signal as well as acquired image signals to the spatial filter portion 4. The camera shutter speed signal is a signal regarding the shutter speed of an electronic shutter of a CCD camera or the like, and is used by the spatial filter portion 4 as a signal for detecting light/dark environments for picture taking.

The spatial filter portion 4 is provided with filter coefficients for different cutoff frequencies of, for example, 10, 20, 30, . . . , N; and is capable of executing the spatial filter process with various cutoff frequencies. The spatial filter portion 4 sets a filter coefficient based on the camera shutter speed signal, and executes a spatial filter process optimal to the picture taking environment. The spatial filter portion 4 performs the spatial filter process by using a spatial filter that has a higher cutoff frequency for a higher camera shutter speed or a brighter environment for picture taking.

According to the image pickup apparatus of this embodiment, the spatial filter process is performed by selecting an appropriate cutoff frequency corresponding to the brightness of the picture tanking environment. Therefore, it becomes possible to appropriately display picked-up images in accordance with the picture taking environment.

For example, in an application of the image pickup apparatus to a visual recognition support system for assisting a driver of a vehicle in visual recognition during a nighttime drive of the vehicle, a filter coefficient for a low cutoff frequency is set for the spatial filter process when there is no oncoming vehicle and therefore the picture taking environment is dark. As a result, an image after being image-processed is displayed in a bright state, so that the vehicle driver can appropriately make visual identification in a view ahead of the vehicle. Conversely, if there is an oncoming vehicle and therefore the picture taking environment is bright, a filter coefficient for a high cutoff frequency is set. Therefore, an image after being image-processed is displayed in a dark state such that the halation caused by the headlights of the oncoming vehicle has been reduced. Hence, the vehicle driver can appropriately make visual identification in a view ahead of the vehicle.

Figure 8:
FIG. 8 illustrates images taken by the image pickup apparatus in accordance with the third embodiment.
Figure 8:
Figure 8:
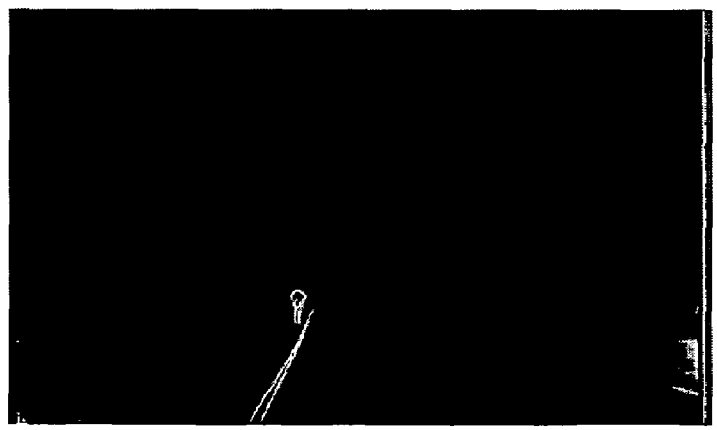
Figure 9:
FIG. 9 illustrates images taken by the image pickup apparatus in accordance with the third embodiment.
Figure 9:
Figure 9:

FIG. 8 shows images taken in a case where there is an oncoming vehicle at night. FIG. 9 shows images taken in a case where there is no oncoming vehicle at night. The upper image in FIG. 8 is an image taken when there is an oncoming vehicle on a road at night and subjected to the image processing via a low-cutoff frequency spatial filter. Due to the oncoming vehicle, the picture taking environment is bright, and halation is caused by the headlights of the oncoming vehicle. In this case, the camera shutter speed of the image pickup portion 2 is high. By setting a spatial filter having a high cutoff frequency based on the camera shutter speed signal, the entire image is displayed in a dark state as shown at the bottom in FIG. 8. That is, an acquired image can be displayed in a state where the halation caused by the headlights of the oncoming vehicle has been reduced. In the lower image in FIG. 8, a pedestrian at the right-side end of the road can be clearly recognized visually.

The upper image in FIG. 9 is an image taken when there is no oncoming vehicle on a road at night and subjected to the image processing via a high-cutoff frequency spatial filter. Since there is no oncoming vehicle, the picture taking environment is dark. In this case, the camera shutter speed of the image pickup portion 2 is a low speed. By setting a spatial filter having a low cutoff frequency based on the low camera shutter speed signal, the entire image is displayed in a bright state as shown in the bottom in FIG. 9, so that the vehicle driver can clearly make visual recognition in the forward direction on the road.

According to the image pickup apparatus of this embodiment, the brightness of the picture taking environment can be detected through the use of the camera shutter speed signal from the image pickup portion 2. Therefore, appropriate picture taking corresponding to the picture taking environment can be performed without provision of an external sensor for detecting the ambient brightness.

Fourth Embodiment

Figure 10:
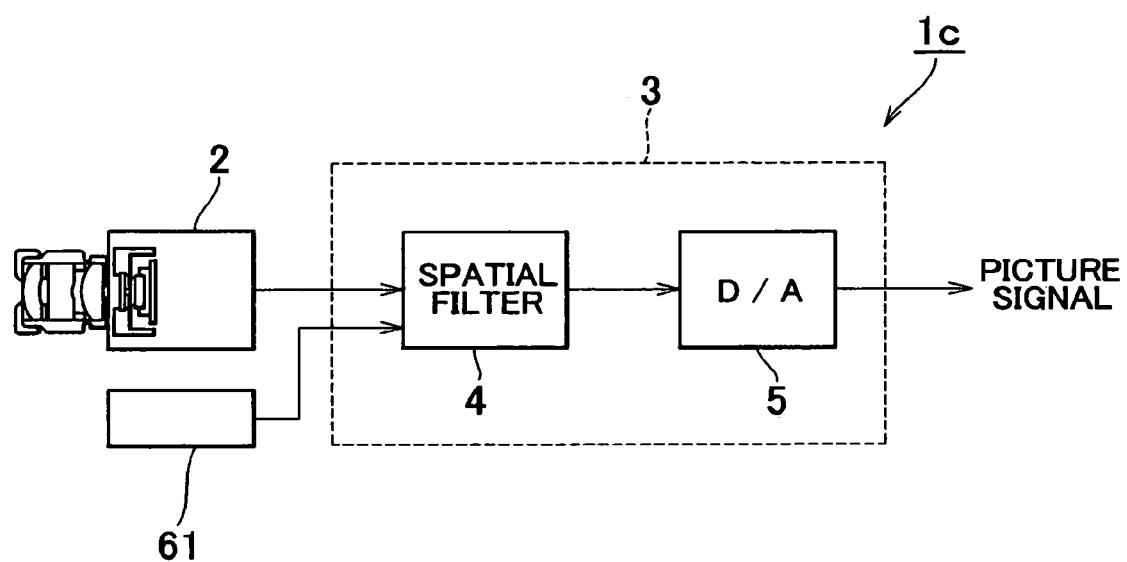
FIG. 10 is a schematic diagram illustrating the construction of an image pickup apparatus in accordance with a fourth embodiment.

An image pickup apparatus in accordance with a fourth embodiment of the invention will next be described. FIG. 10 is a schematic diagram illustrating the construction of the image pickup apparatus of this embodiment. As shown in FIG. 10, the image pickup apparatus 1c of this embodiment has substantially the same hardware construction as the image pickup apparatus 1 of the first embodiment shown in FIG. 1, but differs therefrom in that the image pickup apparatus 1c further has an illuminance sensor 61 for detecting the brightness of the picture taking environment. In the image pickup apparatus of this embodiment, the spatial filter portion 4 has a plurality of spatial filters having different cutoff frequencies. The spatial filter portion 4 inputs a detection signal from the illuminance sensor 61, and executes a spatial filter process by using an optimal spatial filter on the basis of the detection signal.

The illuminance sensor 61 detects the light/dark state of the picture taking environment. The illuminance sensor 61 is connected to the spatial filter portion 4, and outputs the detection signal to the spatial filter portion 4. The spatial filter portion 4 is provided with filter coefficients for different cutoff frequencies of, for example, 10, 20, 30, . . . , N, and is capable of executing the spatial filter process with various cutoff frequencies. The spatial filter portion 4 sets a filter coefficient based on the detection signal from the illuminance sensor 61, so as to perform a spatial filter process optimal to the picture taking environment. The spatial filter portion 4 performs the spatial filter process by using a spatial filter that has a higher cutoff frequency if the picture taking environment is brighter.

The image pickup apparatus of this embodiment performs the spatial filter process by selecting an appropriate cutoff frequency corresponding to the brightness of the picture taking environment, as in the foregoing image pickup apparatus of the third embodiment. Therefore, appropriate images in accordance with the picture taking environment can be displayed.

According to the image pickup apparatus of the embodiment, it is not necessary to input a camera shutter speed signal from the image pickup portion 2 to the spatial filter portion 4, and mere input of image signals allows the picture taking in accordance with the picture taking environment.

Fifth Embodiment

Figure 11:
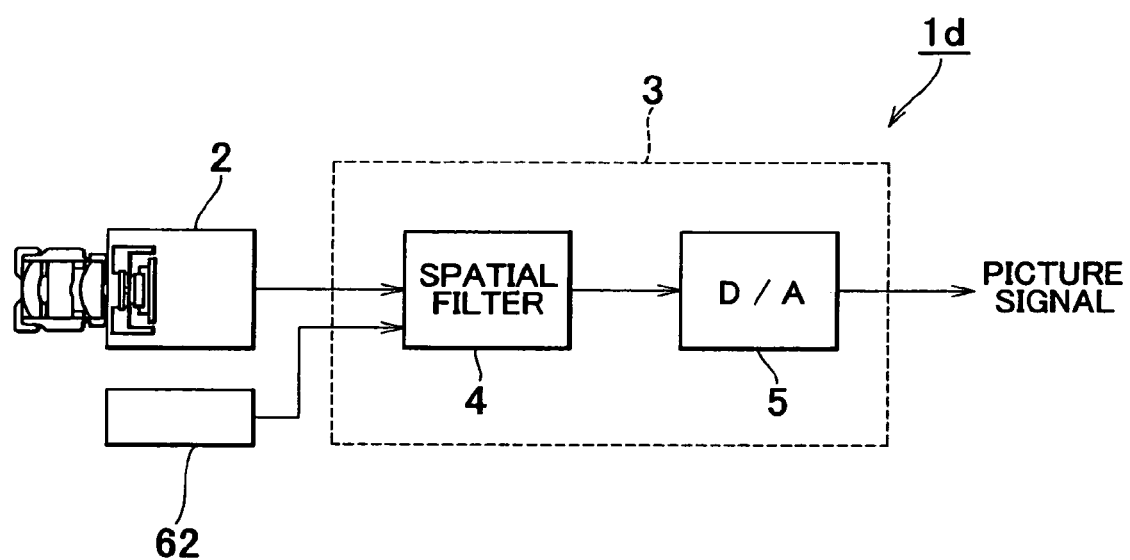
FIG. 11 is a schematic diagram illustrating the construction of an image pickup apparatus in accordance with a fifth embodiment.

An image pickup apparatus in accordance with a fifth embodiment will next be described. FIG. 11 is a schematic diagram illustrating the construction of the image pickup apparatus of this embodiment. As shown in FIG. 11, the image pickup apparatus 1d of this embodiment has substantially the same hardware construction as the image pickup apparatus 1 of the first embodiment shown in FIG. 1, but differs in that the image pickup apparatus 1d has a raindrop sensor 62 for detecting the weather condition. In the image pickup apparatus of this embodiment, the spatial filter portion 4 has a plurality of spatial filters having different cutoff frequencies. The spatial filter portion 4 performs the spatial filter process by selecting a spatial filter corresponding to the weather condition at the time of taking pictures.

The raindrop sensor 62 detects the weather condition at the time of picture taking, and is capable of detecting whether it is raining. The raindrop sensor 62 is connected to the spatial filter portion 4, and outputs a detection signal to the spatial filter portion 4. The spatial filter portion 4 has at least a filter coefficient for a low cutoff frequency for the rainy weather and a filter coefficient for a high cutoff frequency for clear weather, and is therefore able to perform the spatial filter process by selecting a spatial filter of a cutoff frequency corresponding to the weather condition. The spatial filter portion 4 sets a filter coefficient based on the detection signal from the raindrop sensor 62, so as to perform a spatial filter process optimal to the picture taking environment.

According to the image pickup apparatus of this embodiment, the spatial filter process is performed by selecting an appropriate cutoff frequency corresponding to the weather condition at the time of picture taking, so that an appropriate image in accordance with the picture taking environment can be displayed.

Figure 12:
FIG. 12 illustrates images taken by the image pickup apparatus shown in FIG. 11.
Figure 12:
Figure 12:
Figure 13:
FIG. 13 illustrates images taken by the image pickup apparatus shown in FIG. 11.
Figure 13:
Figure 13:
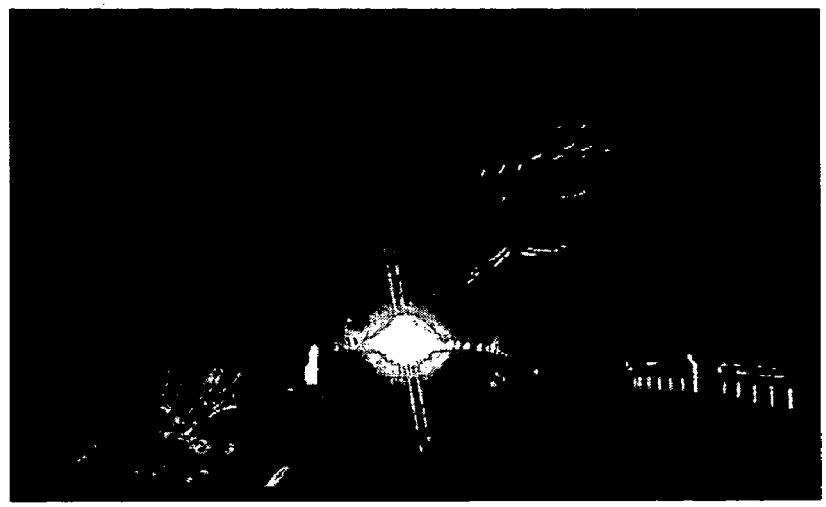

FIG. 12 shows images taken in a clear night. FIG. 13 shows images taken in a rainy night. The upper image in FIG. 12 is an image of a road at night that has been image-processed via a low-cutoff frequency spatial filter suitable for the rainy weather despite clear weather in reality. Since the selected cutoff frequency is not appropriate, the image is excessively bright and halation has been caused to some extent by the headlights of an oncoming vehicle. Thus, in clear weather, a high-cutoff frequency spatial filter for clear weather should be used for the image processing as in the lower image in FIG. 12, in which the halation caused by the oncoming vehicle's headlights is reduced and the road is clearly visible.

The upper image shown in FIG. 13 is an image of a road at night that has been image-processed via a high-cutoff frequency spatial filter suitable for clear weather despite the rainy weather in reality. Since the selected cutoff frequency is not appropriate, the image is excessively dark and the entire road is not easily visible. In contrast, the image processing through the use of a low-cutoff frequency spatial filter suitable for the rainy weather provides an image as shown at the bottom in FIG. 13, in which the entire road is displayed in a bright state and the road is clearly visible.

Although in this embodiment, the raindrop sensor 62 is used to detect the weather condition, the weather condition may also be detected on the basis of a windshield wiper operation signal. It is also possible to acquire a weather condition based on the weather information received from an external device, and set a cutoff frequency based on the acquired weather condition. These modifications achieve substantially the same operation and advantages as the image pickup apparatus of this embodiment.

Although in this embodiment, the spatial filter cutoff frequency is changed on the basis of whether it is raining, the spatial filter cutoff frequency may also be changed on the basis of whether there is snow cover. For example, the state of snow cover is acquired, and a cutoff frequency is set on the basis of the state of snow cover, and the thus-set cutoff frequency is used for the spatial filter process. In this manner, it becomes possible to display an appropriate image in accordance with the state of snow cover.

The cutoff frequency may also be changed in accordance with changes in the ambient brightness with the elapse of time. For example, time information is acquired, and a cutoff frequency is set on the basis of the time information, so that the spatial filter process is performed with the set cutoff frequency. Thus, images can be appropriately displayed in accordance with changes in the ambient brightness, for example, when it becomes gradually dark during the evening twilight.

Sixth Embodiment

An image pickup apparatus in accordance with a sixth embodiment will next be described. The image pickup apparatus of this embodiment has substantially the same hardware construction as the image pickup apparatus 1 of the first embodiment shown in FIG. 1. In the sixth embodiment, the spatial filter portion 4 performs a spatial filter process of removing a predetermined low-frequency component from an acquired image so that in the processed image, the pixel brightness value of an object apart from the image pickup means by at least a predetermined distance becomes greater than the pixel brightness value of an object within the predetermined distance from the image pickup means.

In the image pickup apparatus of this embodiment, the spatial filter portion 4 is provided with cutoff frequencies set on the basis of the ratio between the pixel region of an image-pickup object present at a predetermined distance and the pixel region of the entire image acquired. If the image-pickup object is a human, a cutoff frequency is set on the basis of the ratio of the pixel region of the human present at the predetermined distance from the image pickup portion 2 and the pixel region of the entire image acquired.

For example, in a case as shown in FIG. 14 where the laterally counted number of pixels of a human 71 present at a predetermined distance from the image pickup apparatus is a and the laterally counted number of pixels of the entire image 70 is b, the spatial filter cutoff frequency is set on the basis of the ratio b/a of the numbers of pixels. The predetermined distance herein is set in accordance with the distance of a distant object if an enhanced display of the distant object by the image pickup apparatus is desired. It is to be noted that the number a of pixels for the human 71 decreases as the distance of the human 71 increases. As the distance increases, the cutoff frequency b/a increases since the number a decreases.

By setting the cutoff frequency in this manner, the pixel brightness value of an image portion of a greater displayed size is reduced. Therefore, although a human present farther than the predetermined distance appears smaller on the display than a human present at the predetermined distance, the pixel brightness value of the distant human becomes relatively great, so that the distant human is displayed in an enhanced fashion. Hence, if the image pickup apparatus of this embodiment is applied as a picture taking means of a visual recognition support system as mentioned above, the apparatus is particularly useful due to its ability to display a distant human or the like in an enhanced fashion.

Figure 15:
FIG. 15 illustrates images taken by the image pickup apparatus in accordance with the sixth embodiment.
Figure 15:
Figure 15:
Figure 16:
FIG. 16 illustrates images taken by the image pickup apparatus in accordance with the sixth embodiment.
Figure 16:
Figure 16:
Figure 17:
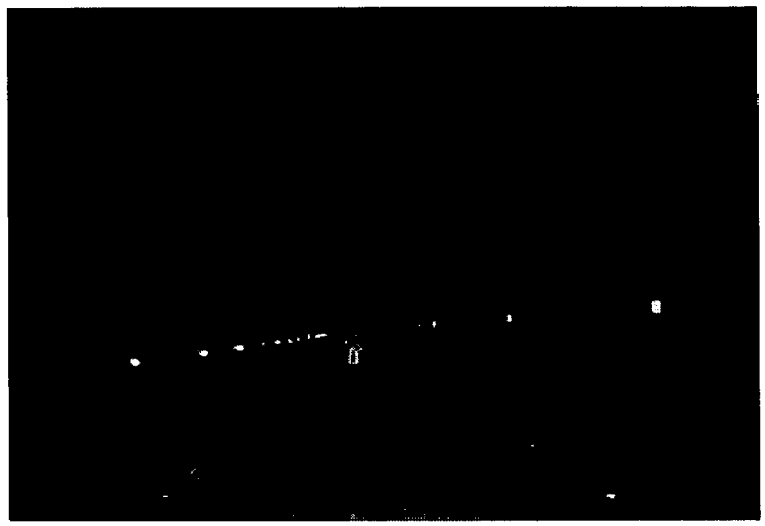
FIG. 17 illustrates images taken by the image pickup apparatus in accordance with the sixth embodiment.
Figure 17:
Figure 17:

FIGS. 15 to 17 show images obtained before and after the spatial filter process by the image pickup apparatus of the embodiment. The upper image in FIG. 15 is a pre-spatial filter process image that contains an image of a human present at a distance of 40 meters. The lower image in FIG. 15 is a post-spatial filter process image containing an image of the human at the distance of 40 meters. The spatial filter process has been performed with a cutoff frequency set for enhanced display of an image-pickup object present farther than 40 meters. In the upper and lower images in FIG. 15, the human is displayed with substantially the same brightness.

The upper image in FIG. 16 is a pre-spatial filter process image that contains an image of a human present at a distance of 100 meters, and the lower image in FIG. 16 is a post-spatial filter process image containing an image of the human at the distance of 100 meters. The display of the human is slightly clearer in the lower image than in the upper image in FIG. 16.

The upper image in FIG. 17 is a pre-spatial filter process image that contains an image of a human present at a distance of 150 meters, and the lower image in FIG. 17 is a post-spatial filter process image containing an image of the human at the distance of 150 meters. The display of the human is clearer in the lower image than in the upper image in FIG. 17.

FIG. 18 is a graph indicating relationships between the distance of a human and the pixel brightness value before and after the spatial filter process has been performed with a cutoff frequency set so as to enhance the display of objects present farther than a reference distance A.

In FIG. 18, the human at the distance A is provided with substantially equal values of pixel brightness before and after the process. However, as the distance of the human increases from the distance A, the pixel brightness value thereof decreases in the pre-spatial filter process images. In contrast, in the image after the spatial filter process, the pixel brightness value of the human does not decrease but is kept high as the distance thereof increases. Therefore, it should be apparent that in the post-spatial filter process images, the displayed images of the human present farther than the distance A are brighter and clearer, and therefore the visibility thereof is improved by the process. Furthermore, as indicated in FIG. 18, in the post-spatial filter process images, the pixel brightness value of the human increases as the distance of the human increases provided that the distance is less than the reference distance A.

According to the image pickup apparatus of this embodiment, the pixel brightness value of an image-pickup object apart from the image pickup portion 2 of the image pickup apparatus by at least a predetermined distance is made relatively great, so that the distant object is displayed in an enhanced fashion in the picked-up image. Therefore, the visibility of distant objects can be improved. The image pickup apparatus of this embodiment is particularly useful in the application to a visual recognition support system that assists a driver of a vehicle in visual recognition during a nighttime run of the vehicle.

Although in the foregoing embodiments, the image pickup apparatus is applied to a visual recognition support system that assists a driver of a vehicle in visual recognition during a nighttime run of the vehicle, the image pickup apparatus of the invention is not limited so, but is also applicable to other systems such as a road white line recognition system and the like. Furthermore, the image pickup apparatus of the invention may also be applied to apparatuses for purposes other than the vehicular application.

What is claimed is:

1. An image pickup apparatus comprising:
    an image pickup portion that receives an incident light from an image-pickup object and performs a photoelectric conversion of the light; and
    an image processing portion that performs a spatial filter process of removing a predetermined low-frequency component from a picked-up image output by the image pickup portion,
    wherein due to the spatial filter process performed by the image processing portion, a pixel brightness value of the picked-up image of a range of at least a predetermined distance from the image pickup portion becomes relatively greater than a pixel brightness value of the picked-up image of a second range of less than the predetermined distance from the image pickup portion.

2. The image pickup apparatus according to claim 1, wherein with regard to the second range of less than the predetermined distance from the image pickup portion in the picked-up image, the image processing portion increases the pixel brightness value with increases in the distance from the image pickup portion.

3. The image pickup apparatus according to claim 1, wherein the image processing portion performs the spatial filter process with a cutoff frequency set based on a ratio between a pixel region of the image-pickup object at the predetermined distance and a pixel region of the entire picked-up image.

4. The image pickup apparatus according to claim 1,
    wherein the image processing portion performs the spatial filter process via a spatial filter of a predetermined cutoff frequency that is set in accordance with a picture taking environment, the image processing portion setting the cutoff frequency based on a brightness of the picture taking environment.

5. The image pickup apparatus according to claim 4, wherein the image processing portion sets the cutoff frequency higher the brighter the picture taking environment.

6. The image pickup apparatus according to claim 4, further comprising an illuminance sensor that detects the brightness of the picture taking environment, wherein the image processing portion sets the cutoff frequency based on the brightness of the picture taking environment detected by the illuminance sensor.

7. The image pickup apparatus according to claim 4, wherein the image processing portion sets the cutoff frequency based on a weather condition.

8. The image pickup apparatus according to claim 7, wherein the image processing portion sets the cutoff frequency for a rainy weather lower than the cutoff frequency for clear weather.

9. The image pickup apparatus according to claim 7, further comprising a raindrop sensor that detects the weather condition,
wherein the image processing portion sets the cutoff frequency based on the weather condition detected by the raindrop sensor.

10. The image pickup apparatus according to claim 4, wherein the image pickup portion is disposed in a vehicle and takes an image of the image-pickup object present in a traveling direction of the vehicle.

11. The image pickup apparatus according to claim 4, wherein the image pickup apparatus is used in a visual recognition support system that assists a driver of a vehicle in visual recognition during a nighttime run of the vehicle.

12. The image pickup apparatus according to claim 4, wherein the brightness of the picture taking environment is detected through the use of a camera shutter speed signal from the image pickup portion.

13. The image pickup apparatus according to claim 1, wherein the image pickup portion is disposed in a vehicle and takes an image of the image-pickup object present in a traveling direction of the vehicle.

14. The image pickup apparatus according to claim 1, wherein the image pickup apparatus is used in a visual recognition support system that assists a driver of a vehicle in visual recognition during a nighttime run of the vehicle.

15. An image pickup method for an image pickup apparatus having an image pickup portion that receives an incident light from an image-pickup object and performs a photoelectric conversion of the light, and an image processing portion that performs an image processing of a picked-up image, the method comprising the steps of:

outputting the picked-up image, and performing a spatial filter process of removing a predetermined low-frequency component from the picked-up image output by the image pickup portion, wherein due to the spatial filter process performed by the image processing portion, a pixel brightness value of the picked-up image of a range of at least a predetermined distance from the image pickup portion becomes relatively greater than a pixel brightness value of the picked-up image of a second range of less than the predetermined distance from the image pickup portion.

16. The image pickup method of claim 15, wherein the spatial filter process is performed via a spatial filter of a predetermined cutoff frequency that is set in accordance with a picture taking environment, the image processing portion setting the cutoff frequency based on a brightness of the picture taking environment.

* * * * *